May 20, 1930.　　M. W. PYSHER ET AL　　1,759,803
PIPE CLEAN-OUT FITTING
Filed March 9, 1929
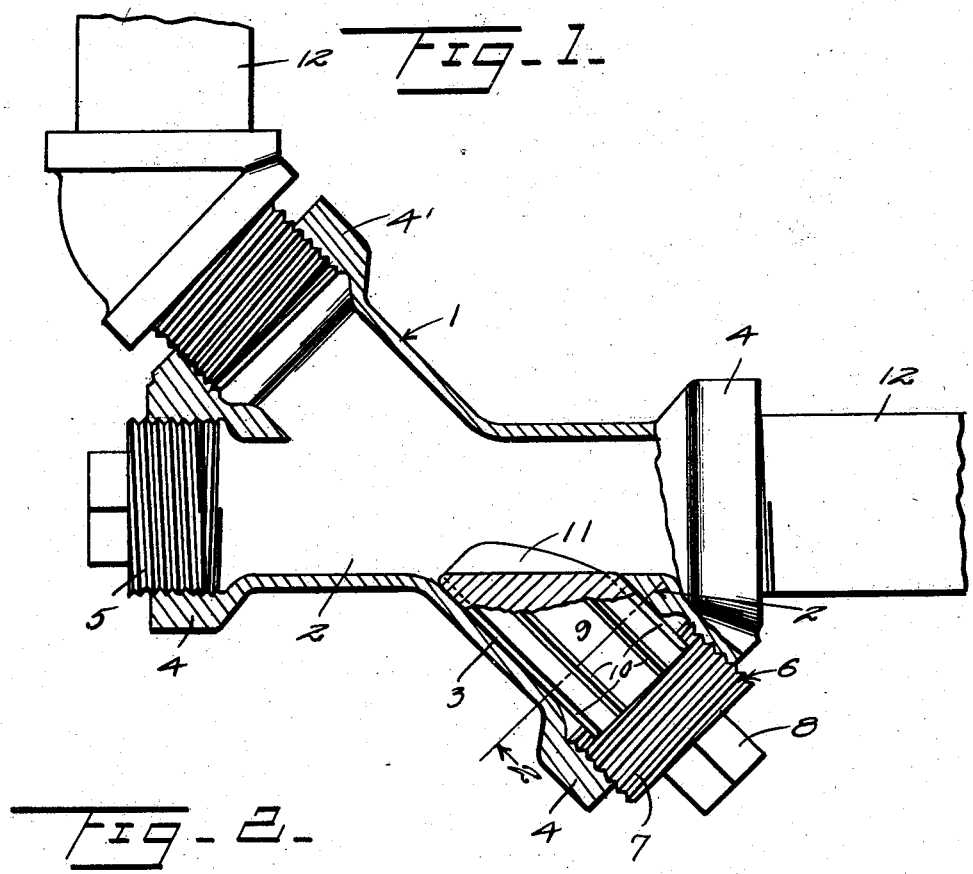
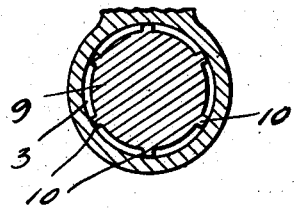
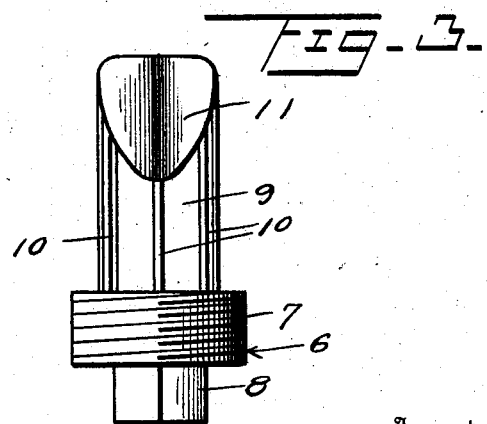
Inventor
M. W. Pysher
F. L. Pysher Patented May 20, 1930

1,759,803

UNITED STATES PATENT OFFICE

MAURICE W. PYSHER AND FRED L. PYSHER, OF WALLA WALLA, WASHINGTON

PIPE CLEAN-OUT FITTING

Application filed March 9, 1929. Serial No. 345,730.

This invention relates to the class of water distribution and pertains particularly to an improved fitting for waste pipes designed to facilitate the cleaning out of the same.

The primary object of the present invention is to provide a fitting which may be inserted at any point in a pipe line, that is in a straight line or at an elbow or turn, the character of the fitting being such that in any of these positions easy access may be had to the interior of the pipe line for the cleaning thereof.

Another object of the invention is to provide, in a manner as hereinafter set forth, a cleanout fitting having an off set portion normally closed by a plug and having associated with the plug a stem designed to close the off set portion so that the collection of sediment or grease in the off set will not occur to any great extent.

Still another object of the invention is to provide a means whereby in a plug of this character any grease or sediment which may have collected in the off set referred to above will be cleanly removed from the wall of the off set portion when the plug is rotated for removal.

The invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a sectional view of the fitting embodying the present invention showing the same connecting a pair of angularly relating pipe lines;

Figure 2 is a sectional view taken substantially upon the line 2—2 of Figure 1;

Figure 3 is a detailed elevational view of the special plug for use in the coupling.

Referring to the drawing in detail wherein like numerals of reference indicate corresponding parts throughout the several views, the numeral 1 indicates as a whole the fitting embodying the present invention, the same consisting as shown, of a four-way piece forming two passage-ways 2 and 3 arranged in acute angular relation so that the angle between the adjacent ends 4 is of approximately 45°.

Each of the open ends 4 of the fitting is interiorly threaded and there is provided with each fitting a standard plug 5 and a special type of plug indicated by the numeral 6. The special type of plug 6 comprises a body 7 having a polygonal shaped head 8 upon one end to facilitate the application of a wrench to the plug and extending from the opposite end is a stem 9, relatively long and of less diameter than the plug. The stem 9 is provided with a plurality of longitudinally extending ribs 10 and the upper end thereof is cut off at an angle of approximately 45° as indicated at 11 and the face is depressed or dished so that when the plug 7 is fitted into one of the outlets 4, the stem 9 will terminate with its curved face flush with the inner face of the passage extending thereacross.

The application of the fitting is shown in Figure 1 wherein the fitting is shown as forming an elbow between a pair of right angularly related pipes 12. As is shown, the outlet end or arm of the fitting which is in alignment with the horizontal one of the pipes 12 is closed by the standard plug 5 whereas the outlet end of the other arm of the fitting is closed by the special plug 6. The stem 9 of the special plug fills the end of the fitting arm in which the plug is positioned so that this end of the arm is prevented from trapping to any great extent, sediment or grease which may flow through the pipes.

As it is desirable that these special plugs be made of brass or similar material it is necessary that the stems be formed so that there will not be too close a relation between them and the body of the arm of the fitting in which the special plug is placed, therefore, a slight space is left between the stem and the wall of the fitting.

In order to clean off of the face of the wall any grease which may have accumulated thereon between the wall and the stem, the ribs 10 are placed upon the stem, each of which comes into relatively close proximity to the wall of the fitting and acts when the plug is rotated for removal to scrape loose any grease which may have accumulated thereon.

From the foregoing description it will be readily seen that with the cleanout fitting embodying this invention easy access may be had at any time to either of the pipe lines for the insertion of a cleaning tool or for the performance of any cleaning or other type of operation where access must be had to the interior of the pipe.

While we have shown and described the present fitting in association with a pair of pipes arranged in right angular relation, it is, of course, obvious that it may be employed in various positions, as for example, in straight lines or in lines where the angular relation between the pipe members may be more than 45°. As the plugs 5 and 6 may be placed in any one of the four openings of the fitting this positioning of the fitting in the various places may be readily accomplished.

Having described our invention, what we claim is:—

1. A cleanout fitting, comprising a hollow body having three arms one arranged at an angle with relation to the other two and each interiorly threaded at its end, a plug adapted to be threadably engaged in any one of the arms having a stem designed to close the arm to the point of intersection therewith of an adjacent arm, said stem being smaller than the interior diameter of the fitting arm, and means carried by the stem for cleaning the face of the adjacent wall of the arm in which it is positioned when rotated for removal therefrom.

2. A cleanout fitting, comprising a hollow body formed to provide a pair of passageways crossing one another at an acute angle providing the fitting with four outlets, the wall of the fitting at each outlet being interiorly threaded, and a plug designed to fit any one of the four outlets, said plug having a stem formed integral therewith for substantially filling the end of a passage in which it is positioned to the point of intersection therewith of the other passage, said stem being of less diameter than the passages and having ribs formed upon the face thereof designed to position in close proximity to the wall of a passage in which it is located to clean the adjacent face of the passage wall when rotated for removal from the passage.

In testimony whereof we hereunto affix our signatures.

MAURICE W. PYSHER.
FRED L. PYSHER.